US007768420B2

(12) United States Patent
Neogi et al.

(10) Patent No.: US 7,768,420 B2
(45) Date of Patent: Aug. 3, 2010

(54) OPERATION AND CONTROL OF WIRELESS APPLIANCE NETWORKS

(75) Inventors: Raja Neogi, Portland, OR (US); Kam Lee, Vancouver (CA)

(73) Assignee: Intel Corporation, Santa Clara, CA (US)

(*) Notice: Subject to any disclaimer, the term of this patent is extended or adjusted under 35 U.S.C. 154(b) by 1160 days.

(21) Appl. No.: 10/976,428

(22) Filed: Oct. 29, 2004

(65) Prior Publication Data

US 2006/0092037 A1 May 4, 2006

(51) Int. Cl.
*G08C 19/00* (2006.01)
*G08B 5/22* (2006.01)
*H04Q 5/22* (2006.01)

(52) U.S. Cl. ........................... 340/825.69; 340/825.72; 340/825.49; 340/10.2; 340/572.1; 700/65; 700/90

(58) Field of Classification Search ............ 340/825.72, 340/825.69, 825.49, 539.32, 10.2, 572.1, 340/825.22; 455/456.1; 348/734; 345/169, 345/156, 146, 173; 700/65, 90
See application file for complete search history.

(56) References Cited

U.S. PATENT DOCUMENTS 5,552,806 A * 9/1996 Lenchik ...................... 345/156
6,563,430 B1 * 5/2003 Kemink et al. ......... 340/825.49
6,650,902 B1 * 11/2003 Richton ................... 455/456.3
6,731,238 B2 * 5/2004 Johnson ................. 342/357.09
7,024,256 B2 * 4/2006 Krzyzanowski et al. ....... 700/65
7,042,391 B2 * 5/2006 Meunier et al. ........ 342/357.02
7,064,675 B2 * 6/2006 Zigmond et al. ....... 340/825.72
7,359,718 B2 * 4/2008 Tao et al. ................. 455/456.5
7,526,800 B2 * 4/2009 Wright et al. ................. 726/11

* cited by examiner

*Primary Examiner*—Brian A Zimmerman
*Assistant Examiner*—Nam V Nguyen
(74) *Attorney, Agent, or Firm*—Blakely, Sokoloff, Taylor & Zafman LLP

(57) ABSTRACT

A wireless network that may include one or more access points, one or more wireless controllers and one or more appliances. The one or more access points include, or may be coupled with, a server location agent that operates to determine or estimate the locations of the one or more wireless controllers. Upon determining the location of the one or more wireless controllers, the server location agent may determine a proximity of one or more appliances to the wireless controllers and may cause the wireless controllers to display a customized user interface that may be configured based on proximity to one or more appliances as well as policies and/or historical data. In addition, the appliances in the user's proximity may be automatically switched on and controlled to serve the user.

12 Claims, 6 Drawing Sheets

OPERATION AND CONTROL OF WIRELESS APPLIANCE NETWORKS

TECHNICAL FIELD

Embodiments of the invention relate to digital home networks. More particularly, embodiments of the invention relate to location of appliances in a wireless digital home network and tracking of user location using proximity fingerprints, location-dependent control of appliances, and/or automatic movement of multimedia data between appliances in a digital home network.

BACKGROUND

Currently, most audio-video appliances (e.g., televisions, VCRs, DVD players, CD players) are controlled remotely by proprietary remote control devices. Therefore, it is not unusual to find multiple remote control devices in a single room. "Universal" remote control devices have been developed to control multiple appliances from multiple manufacturers to replace the individual remote control devices provided with the respective appliances. However, these universal remote control devices only provide a conglomeration of individual remote control device functionality and do not provide an improved experience with the appliances being controlled.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

Described herein is a wireless network that may include one or more access points, one or more wireless controllers and one or more appliances. The one or more access points may include, or may be coupled with, a server location agent that may operate to determine (or estimate) the locations of the one or more wireless controllers (e.g. PDA, mobile handheld). Upon determining the location of the one or more wireless controllers, the server location agent may determine a proximity of one or more appliances to the wireless controllers and may cause the wireless controllers to display a customized user interface that may be configured based on proximity to one or more appliances as well as policies and/or historical data. In addition, the appliances in the user's proximity may be automatically switched on and controlled to serve the user.

Figure 1:
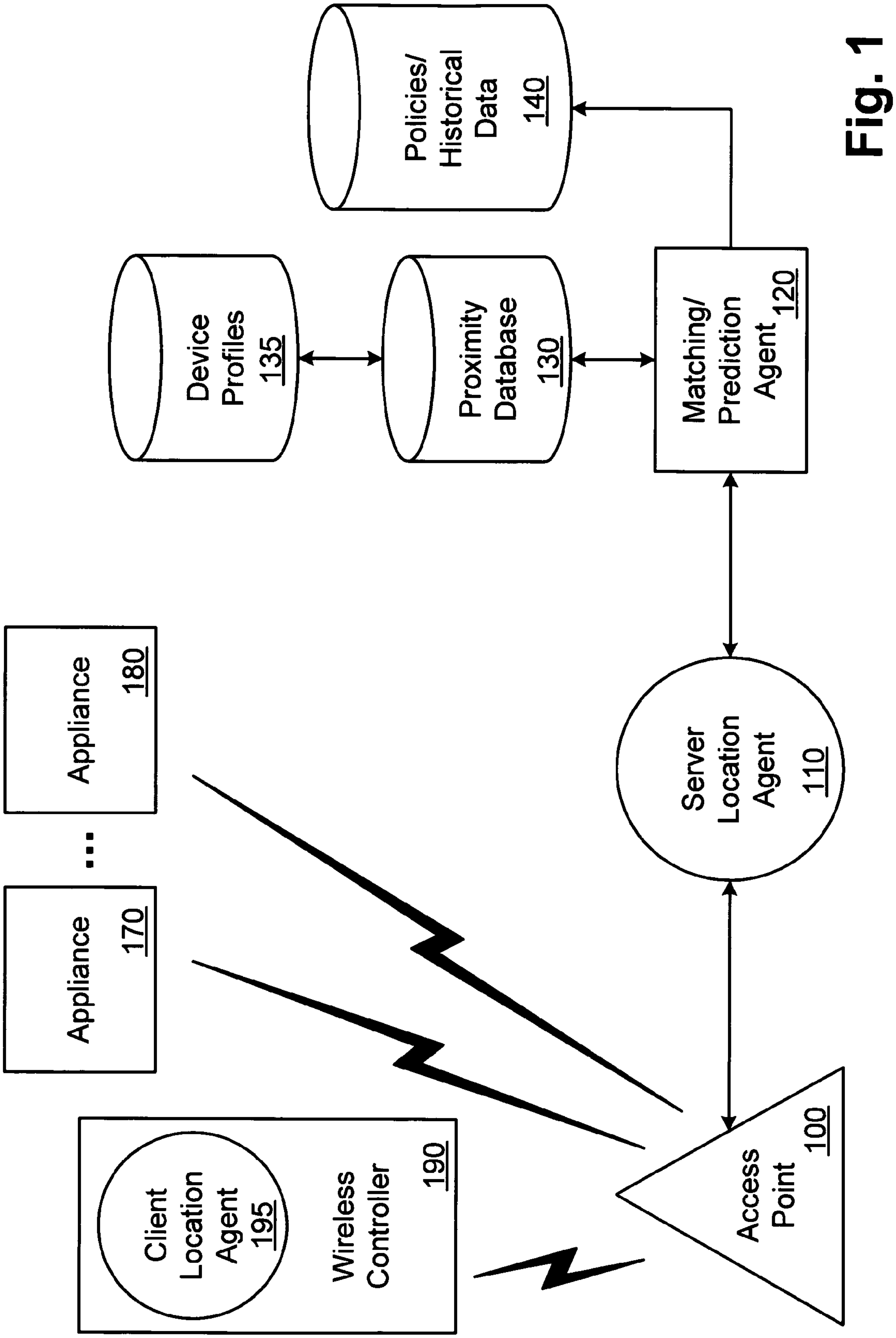
FIG. 1 is a block diagram of one embodiment of multiple appliances connected via a wireless network.

FIG. 1 is a block diagram of one embodiment of multiple appliances connected via a wireless network. In one embodiment, the devices and components of FIG. 1 may be part of a networked home or business environment in which the multiple appliances provide various electronic functionalities. The appliances may include, for example, one or more televisions, one or more audio devices (e.g., a receiver, a CD player, an amplifier), one or more video devices (e.g., a video cassette recorder (VCR), a digital video disc (DVD) player, a satellite or cable television receiver, a set top box), a computer system, an electronic mail appliance and/or other electronic device. In the example of FIG. 1, two appliances are used only for reasons of conciseness of description. Any number of appliances in any number of locations may be supported and/or controlled using the devices and techniques described herein.

In one embodiment, wireless controller 190, appliance 170 and appliance 180 may wireless communicate with access point 100 according to any wireless protocol known in the art. In one embodiment, the wireless protocol used may be, for example, IEEE 802.11b and/or IEEE 802.11g. IEEE 802.11b corresponds to IEEE Std. 802.11b-1999 entitled "Local and Metropolitan Area Networks, Part 11: Wireless LAN Medium Access Control (MAC) and Physical Layer (PHY) Specifications: Higher-Speed Physical Layer Extension in the 2.4 GHz Band," approved Sep. 16, 1999 as well as related documents. IEEE 802.11g corresponds to IEEE Std. 802.11g-2003 entitled "Local and Metropolitan Area Networks, Part 11: Wireless LAN Medium Access Control (MAC) and Physical Layer (PHY) Specifications, Amendment 4: Further Higher Rate Extension in the 2.4 GHz Band," approved Jun. 27, 2003 as well as related documents. Other wireless protocols may also be used in addition to, or in place of, the IEEE 802.11b/g protocols listed above.

Wireless controller 190 may be any type of control device capable of being used to control appliances 170 and 180 using wireless signals. For example, wireless controller may be a personal digital assistant (PDA), a smartphone, a cellular-enabled PDA, a universal controller, etc. The wireless protocol used for wireless controller 190 to communicate with access point 100 may be the same as or different than the wireless protocol used for appliances 170 and 180 to communicate with access point 100. Further, the appliances controlled by access point 100 are not required to all communicate using a common wireless protocol.

As described in greater detail below, messages exchanged between wireless controller 190, access point 100 and/or appliances 170 and 180 may be used to estimate a location of wireless controller 190 and to provide an interface or an environment based on the location of wireless controller 190 and to exercise intelligent control of appliances 170 and 180 by the media center. In one embodiment, access controller 100 may interact with server location agent 110 to estimate the location of wireless controller 190. Wireless controller 190 may include client location agent 195 that operates to provide a user interface and/or communicate location information.

In one embodiment, one or more of access point 100, server location agent 110, matching/prediction agent 120, proximity database 130, device profiles 135 and/or policies/historical data 140 may be components of a media center device that may be used to interconnect and control multiple multimedia appliances. In alternate embodiments, access point 100, server location agent 110, matching/prediction agent 120, proximity database 130, device profiles 135 and/or policies/historical data 140 may be components within interconnected electronic devices that may include, for example, a media center, a computer system, a media server, etc.

In one embodiment, once the location of wireless controller 190 is estimated a customized interface may be provided via wireless controller 190 based on, for example, the location of wireless controller 190, the proximity of wireless controller 190 to one or more appliances, previous selections made with wireless controller 190, environmental conditions (e.g., time of day, season, day of the week, month, current events, telephone usage, the number of people and/or controllers within the network), etc. In one embodiment, when a selection is made with wireless controller 190 the conditions selected with wireless controller 190 may selectively move with wireless controller throughout the network area. A determination as to whether the selections may follow wireless controller 190 may be based on the environmental conditions listed above and/or other conditions.

In one embodiment, access point 100 may determine a signal strength of a signal transmitted by wireless controller 190. The signal strength (fingerprint) may be used by server location agent 110 to determine an estimated location of wireless controller 190. In one embodiment, server location agent 110 may operate with matching/prediction agent 120 to determine the estimated location of wireless controller 190. Techniques for determining the estimated location are described in greater detail below. Matching/prediction agent 120 may use data from one or more of proximity database 130, device policies 135 and policies/historical data 140 in the process of determining the estimated location of wireless controller 190.

In one embodiment, proximity database 130 may include information that may be used to map a signal strength to an estimated location of wireless controller 190. While described with respect to FIG. 1 as including a single access point, a wireless appliance network may include multiple access points that my exchange signal strength values in the process of determining the estimated location of wireless controller 190. Device profiles 135 may include information and/or characteristics related to devices in the wireless appliance network, which may include access points, wireless controllers and/or appliances. Policies/historical data 140 may include policies for appliance use and historical data corresponding to historical network device usage.

In the examples below, the location of a wireless controller may be determined based, at least in part, on signal strength. Similarly, the location of one or more appliances may be determined based, at least in part, on signal strength.

Figure 2:
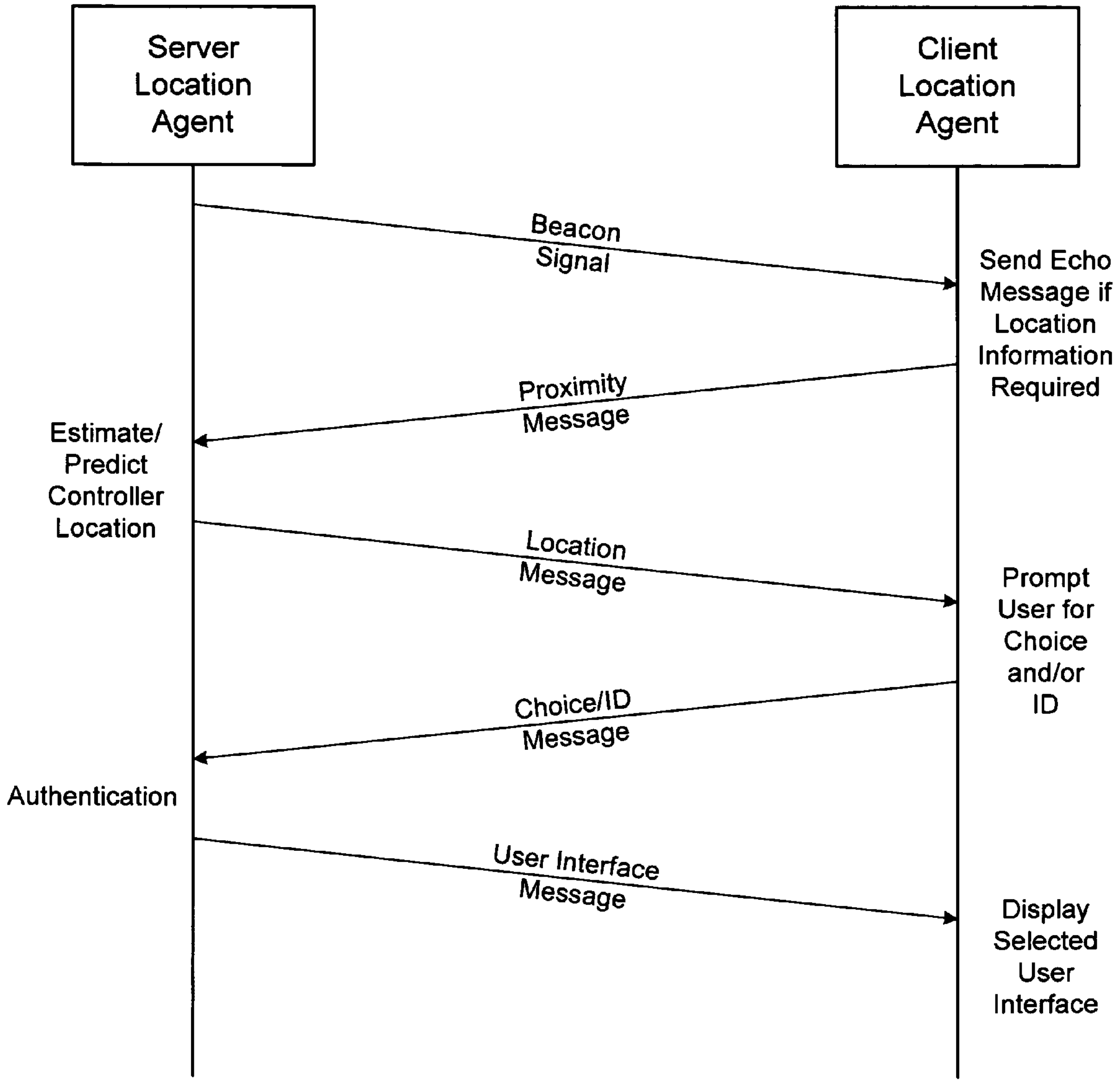
FIG. 2 is a flow diagram of one embodiment of a technique for determining an estimated location of a wireless controller in a wireless appliance network.

FIG. 2 is a flow diagram of one embodiment of a technique for determining an estimated location of a wireless controller in a wireless appliance network. In one embodiment, a client location server agent that may be included within a wireless controller may respond to a beacon signal transmitted by a wireless access point. In one embodiment, in response to the beacon signal, the client location server causes the wireless controller to transmit a proximity message that indicates received signal strength. In response to the proximity message from the wireless controller, the server location agent may initiate a process to determine appliances within a predetermined proximity (e.g., the same room, within a preselected distance) of the wireless controller.

In one embodiment, an access point may periodically transmit a beacon message. In response to the beacon message, one or more server location agents located in corresponding wireless controllers may transmit a proximity message that indicates the signal strength of the beacon signal. If the wireless controller requests location information, an echo message may be transmitted with, or in addition to, the proximity message. Beacon messages may also be transmitted by one or more appliances and may be used in a similar manner to determine a location of the wireless controller and/on an appliance.

In response to the proximity message the server location agent may estimate or predict a location of the wireless controller. The server location agent may use signal strength message included in the proximity message and/or the detected signal strength of the proximity message to estimate/predict the location of the wireless controller. The server location agent may then transmit a location message to the wireless controller with information related to the estimated/predicted location of the wireless controller.

In response to the location message the client location agent may cause the wireless controller to provide a user interface that may be customized based, at least in part, on the estimated/predicted location. The interface may, for example, be configured to control an appliance that is physically the closest to the estimated/predicted location of the wireless controller. The interface may be configured to control one or more appliances located in the same room as the estimated/predicted location of the wireless controller. Other interface configurations may also be provided. In one embodiment, the wireless controller may prompt a user for an identification, which may include, for example, a user name and password, before allowing the user to control an appliance using the wireless controller.

In response to user input the wireless controller may generate and transmit a choice/ID message that includes user choices made via the wireless controller and/or user identification information. The user identification information may be used for authenticate the user of the wireless device before allowing the user to control any appliances. Any authentication procedure known in the art may be used.

In response to a choice made by the user (after optional authentication), one or more appliances may be controlled using the interface presented by the wireless controller. The appliances may be controlled by the signals transmitted by the wireless controller directly or the appliances may be controlled by signals transmitted by the access point in response to choice/ID messages transmitted by the wireless controller. Any protocol known for appliance control (e.g., RF communication, IR communication) may be used.

In one embodiment, the server location agent may transmit a user interface message to the client location agent that may be used to cause the wireless controller to display a user interface or feedback in response to a choice and/or an authentication procedure.

Figure 3:
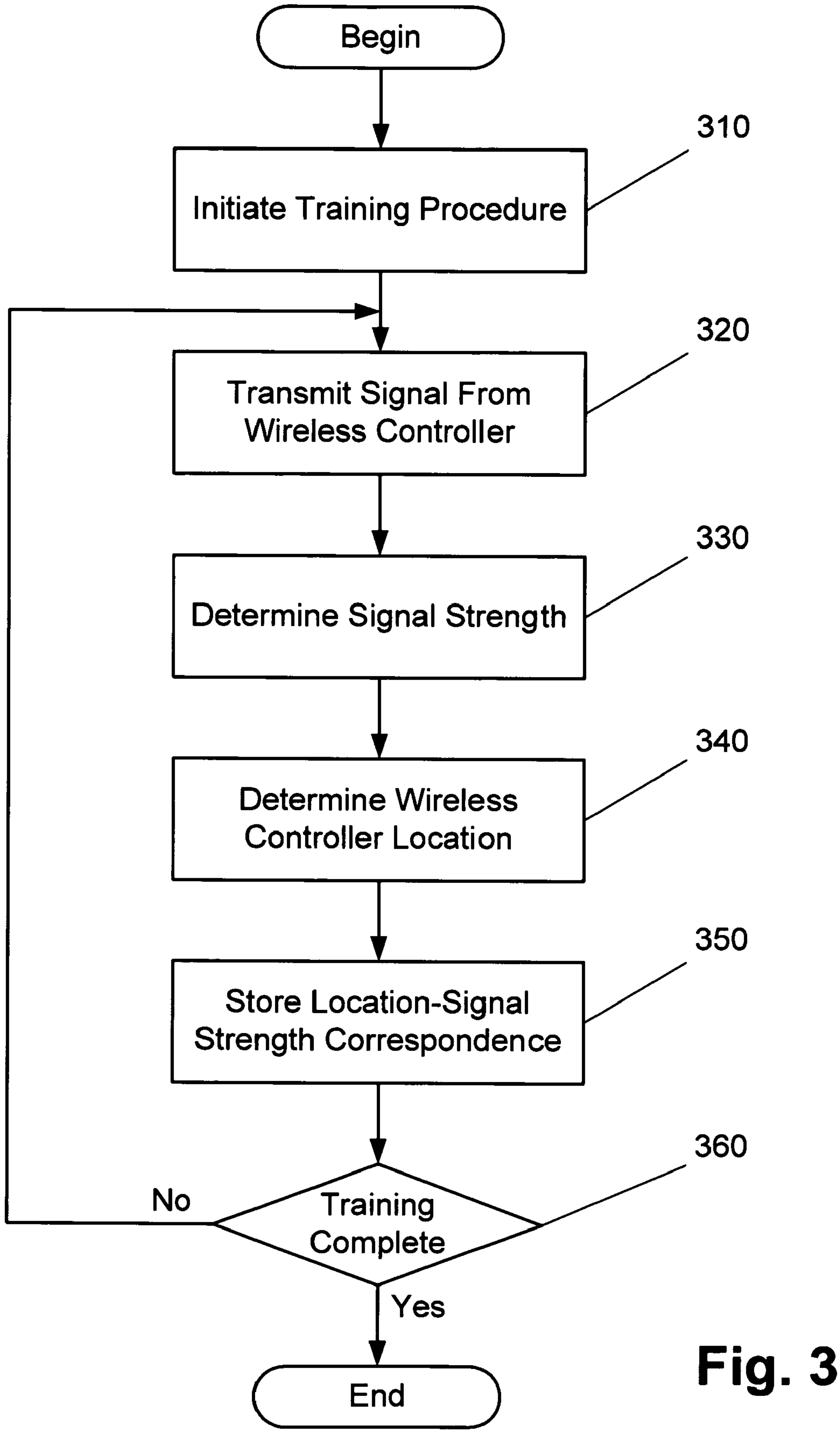
FIG. 3 is a flow diagram of one embodiment of a training procedure that can provide signal strength information that may be used to estimate/predict a location of a wireless controller.

FIG. 3 is a flow diagram of one embodiment of a training procedure that can provide signal strength information that may be used to estimate/predict a location of a wireless controller or an appliance that is not capability of direct communication with the server location. The example training procedure of FIG. 3 is one of many possible training procedures that may be used to generate data that may be use to estimate or predict a location of a wireless controller or an appliance, at least in part, on a signal strength. In this training procedure, the wireless controller may be situated in a location or next to the appliance, and the signal strength received by the wireless controller may be reported back to the server agent. This signal strength may then associated with the location or the appliance next to the wireless controller.

A training procedure is initiated, 310. The training procedure may be initiated, for example, by a user of a wireless controller providing a predetermined input (e.g., pressing a training button, selecting a training option from a drop down menu). The training procedure may also be initiated automatically by the wireless controller, the access point, the server location agent, or any other network device. The automatic initiation of the training procedure may be in response to a first usage of a network device and/or a detected change in network conditions.

In the description of the training procedure that follows the signal strength is described as being determined before the location of the wireless controller is determined. This ordering is not required. That is the location of the wireless controller may be determined prior to, concurrently with, or subsequent to determining signal strength. Thus, the ordering of the description of FIG. 3 is not intended to be limiting with respect to the training procedure.

In one embodiment, the wireless controller may transmit a signal, 320. The signal from the wireless controller may be a response to the beacon signal and/or may include information related to the strength of the beacon signal. The signal strength may be determined, 330. The signal strength may be for the beacon signal as detected by the wireless controller and/or for the signal transmitted by the wireless controller as detected by the access point.

The wireless controller location may be determined, 340. In one embodiment, the wireless location may be determined by prompting a user of the wireless controller to manually enter the location of the wireless controller. Other techniques may also be used to determine the location of the wireless controller. For example, the user may be instructed to position the wireless controller in a predetermined location (e.g., a room center or a room corner) and cause a signal to be transmitted.

Location-signal strength correspondence information may be stored, 350. The location-signal strength correspondence information may include, for example, a detected signal strength for each of multiple locations of the wireless controller. From the stored location-signal strength correspondence information, the server location agent may interpolate or extrapolate to estimate or predict a location of the wireless controller.

If training is not complete, 360, the process may repeat. The process may be repeated as many times as desired to provide a collection of location-signal strength correspondence information that may be used to predict or estimate the location of the wireless controller after completion of the training procedure.

Figure 4:
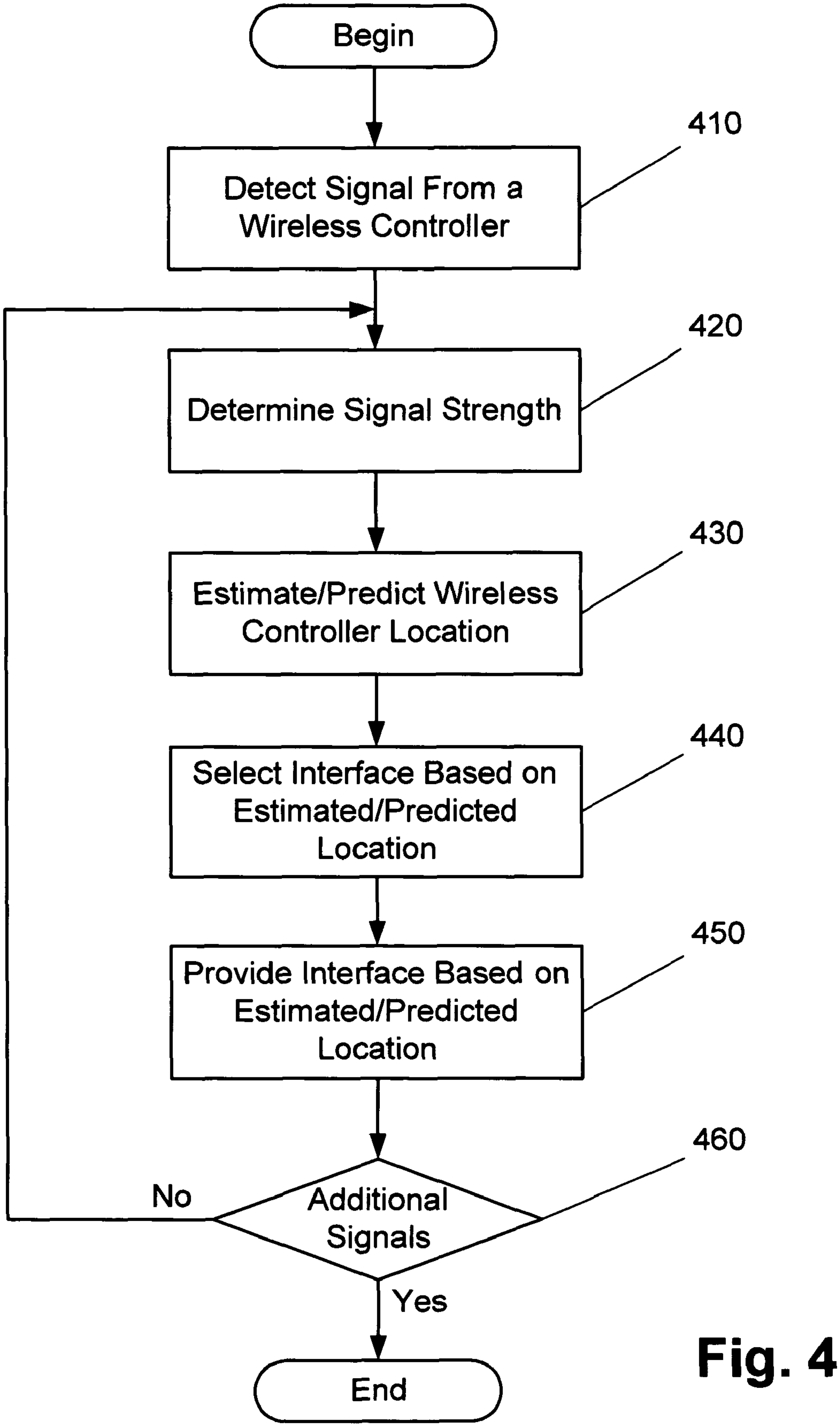
FIG. 4 is a flow diagram of one embodiment of a procedure for estimating/predicting a location of a wireless controller based, at least in part, on a detected signal strength.

FIG. 4 is a flow diagram of one embodiment of a procedure for estimating/predicting a location of a wireless controller based, at least in part, on a detected signal strength. A signal from the wireless controller may be detected, 410. In response to the signal from the wireless controller, a signal strength may be detected, 420. The signal strength may be for the signal transmitted by the wireless controller or for a signal received by the wireless controller (with the signal transmitted by the wireless controller indicating the strength of a signal received by the wireless controller).

Using the signal strength, the location of the wireless controller may be estimated/predicted, 430. The wireless controller location may be estimated/predicted using any known technique for interpolation and/or extrapolation using the stored location-signal strength correspondence information. In response to the estimated/predicted location, an interface to be displayed by the wireless controller may be selected, 440.

In one embodiment, an interface that corresponds to a room in which the wireless controller may be provided. For example, if the wireless controller is located in a room that includes a television and a DVD player, the interface may provide functionality to control the television and DVD player.

Historical data may also be used to select the interface to be provided. For example, if a user historically does not use a television during a particular time of day, if the wireless controller is detected near the television during that time, the interface may not include television functionality because the user likely does not intend to operate the television. Any type of historical data may be used in selecting and/or configuring the interface to be provided by the wireless controller.

In one embodiment, the access point transmits one or more messages to the wireless controller to indicate the user interface to be provided. In response to the one or more messages, the wireless controller may display the selected user interface using any type of input/output devices (e.g., soft keys, touch screen), 450. The user may then use the displayed interface to control the appliances within the wireless network.

If additional signals are received, 460, they may be processed as described above. Thus, the interface provided by the wireless controller may be dynamically modified based on the location of the wireless controller and possibly historical usage of the wireless controller and/or of appliances within the network.

In one embodiment, the estimated/predicted location of the wireless controller may be used to selectively transfer multimedia data. For example, a user may be listening to music using a digital jukebox appliance. When the user leaves the room, for example, to enter the garage, the music stored by the digital jukebox may be transferred to the user's car so that the user may continue to listen to the previously selected music.

As another example, a male user may be watching a baseball game on a television in a den and a female user may be watching a movie in a living room. When the male user moves from the den to the living room the television in the living room may be selectively switched to the baseball game. Factors that may be used to determine whether the living room television should be switched to the baseball game or not may include, for example, time of day and/or time of year (e.g., playoff games may be transferred while regular season games may not be transferred), day of the week, past resolutions, etc. Also, either of the users may be allowed to set one or more preference indicators corresponding to conflicts caused by automatic movement of multimedia data.

In one embodiment, predictive techniques may be used to predict movement of data. For example, if a user views a news program in a kitchen while preparing and/or eating dinner and then views a home remodeling program in a living room after dinner. One or more devices in the network may anticipate the choices made by the user. In one embodiment, prerecorded multimedia data may be played back to the user.

Figure 5:
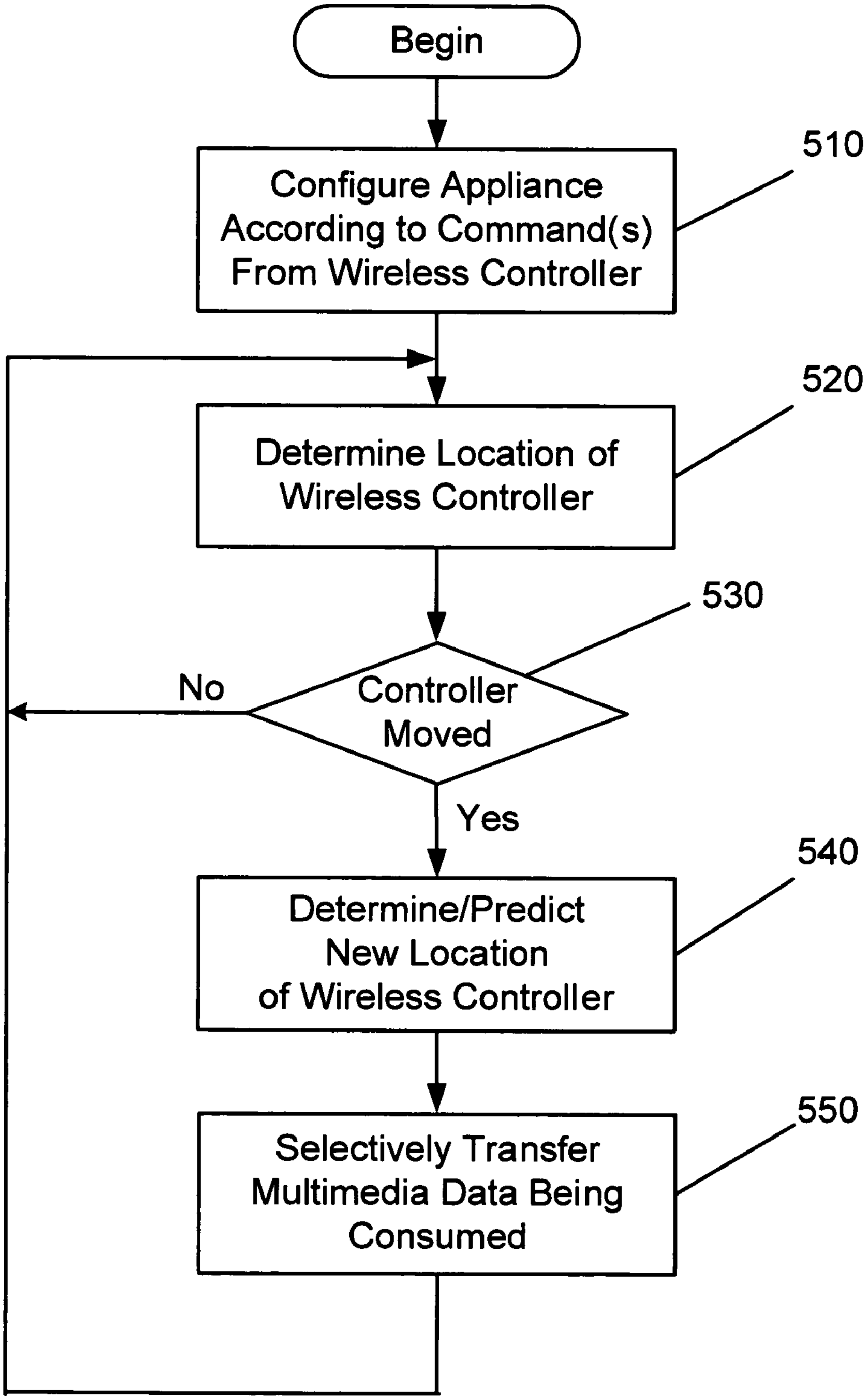
FIG. 5 is a flow diagram of one embodiment of a technique for selectively transferring multimedia content between appliances within a wireless network.

FIG. 5 is a flow diagram of one embodiment of a technique for selectively transferring multimedia content between appliances within a wireless network. One or more appliances are configured according to one or more commands from the wireless controller, 510. The commands from the wireless controller may be transmitted in any manner known in the art (e.g., RF, IR). Also, the commands may be transmitted from the wireless controller directly to the appliance or the commands may be transmitted form the wireless controller to the access point and then to the appliances.

The location of the wireless controller may be determined, 520. Techniques for determining the location of the wireless controller are described above and therefore are not provided in detail with respect to FIG. 5. If the wireless controller has not moved, 530, one or more components of the wireless network detect signals from the wireless controller to determine the location of the wireless controller. Signals transmitted from the wireless controller may be in response to a beacon signal and/or may be transmitted to control one or more network appliances.

If the wireless controller has moved, 530, a new location for the wireless controller is predicted/determined, 540. Techniques for predicting/determining the location of the wireless controller are described above and therefore are not provided in detail with respect to FIG. 5. In response to movement of the wireless controller multimedia data and/or programming selections may be selectively transferred to the predicted or new location of the wireless controller.

In addition to the examples provided above, a user may be viewing a program on a television in a living room when a telephone call is receive (either land line or cellular). The user may leave the living room to take the telephone call. The program may be transferred to a muted television in a room where the user is taking the telephone call so that the user may view the program without sound that may disrupt the telephone conversation. Many more conditions may result in transfer of appliance selections when a wireless controller and/or other device changes locations.

Figure 6:
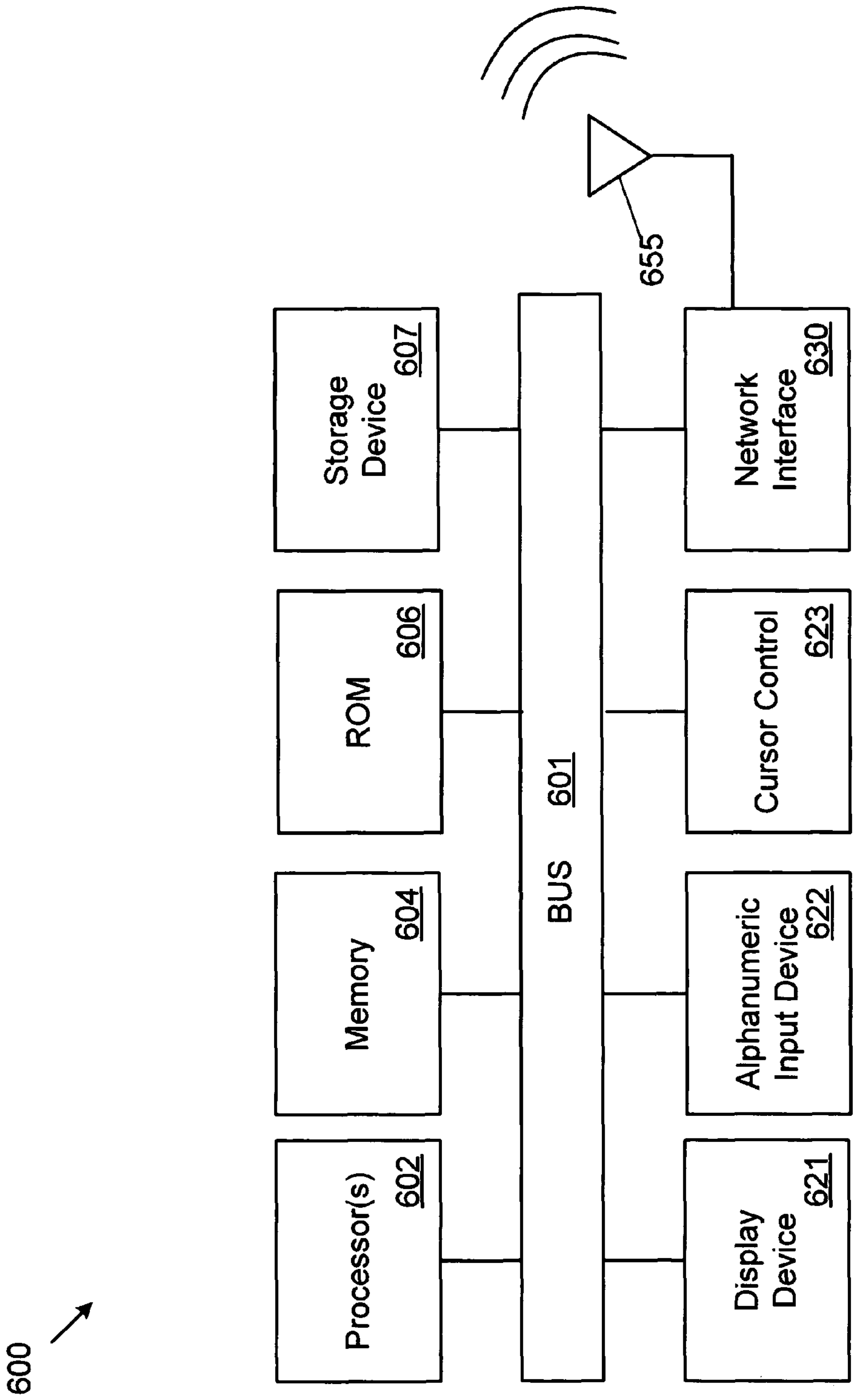
FIG. 6 is a block diagram of one embodiment of an electronic system.

FIG. 6 is a block diagram of one embodiment of an electronic system. The electronic system illustrated in FIG. 6 is intended to represent a range of electronic systems including, for example, desktop computer systems, laptop computer systems, cellular telephones, personal digital assistants (PDAs) including cellular-enabled PDAs, smartphones, set top boxes, network enabled televisions, network enabled DVD players, network enabled audio devices, etc. Alternative systems can include more, fewer and/or different components. The system of FIG. 6 may be adapted to operate as the wireless controller, the access point and/or the appliances.

Electronic system 600 includes bus 601 or other communication device to communicate information, and processor 602 coupled to bus 601 that may process information. While electronic system 600 is illustrated with a single processor, electronic system 600 may include multiple processors and/or co-processors. Electronic system 600 further may include random access memory (RAM) or other dynamic storage device 604 (referred to as main memory), coupled to bus 601 and may store information and instructions that may be executed by processor 602. Main memory 604 may also be used to store temporary variables or other intermediate information during execution of instructions by processor 602.

Electronic system 600 may also include read only memory (ROM) and/or other static storage device 606 coupled to bus 601 that may store static information and instructions for processor 602. Data storage device 607 may be coupled to bus 601 to store information and instructions. Data storage device 607 such as a magnetic disk or optical disc and corresponding drive may be coupled to electronic system 600.

Electronic system 600 may also be coupled via bus 601 to display device 621, such as a cathode ray tube (CRT) or liquid crystal display (LCD), to display information to a user. Alphanumeric input device 622, including alphanumeric and other keys, may be coupled to bus 601 to communicate information and command selections to processor 602. Another type of user input device is cursor control 623, such as a mouse, a trackball, or cursor direction keys to communicate direction information and command selections to processor 602 and to control cursor movement on display 621. Electronic system 600 further may include network interface(s) 630 to provide access to a network, such as a local area network. Network interface(s) 630 may include, for example, a wireless network interface having antenna 655, which may represent one or more antenna(e).

In one embodiment, network interface(s) 630 may provide access to a local area network, for example, by conforming to IEEE 802.11b and/or IEEE 802.11g standards, and/or the wireless network interface may provide access to a personal area network, for example, by conforming to Bluetooth standards. Bluetooth protocols are described in "Specification of the Bluetooth System: Core, Version 1.1," published Feb. 22, 2001 by the Bluetooth Special Interest Group, Inc. Associated as well as previous or subsequent versions of the Bluetooth standard may also be supported. Other wireless network interfaces and/or protocols can also be supported.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, the invention is not limited to the embodiments described, but can be practiced with modification and alteration within the spirit and scope of the appended claims. The description is thus to be regarded as illustrative instead of limiting.

What is claimed is:

1. An article comprising one or more computer-readable medium having stored thereon content that, when executed, cause one or more processors to:

estimate a location of a wireless controller based, at least in part, on a detected signal strength of the wireless controller in relation to retrieved previously generated location-signal strength information, wherein the wireless controller comprises a wireless control device for at least one of the one or more network appliances;

select one or more of the network appliances based, at least in part, on the estimated location, device policies associated with the wireless controller, and historical data corresponding to previous use of the wireless controller, wherein the selected one or more network appliances share a wireless local area network, and the appliances comprise one or more of: one or more televisions, one or more radio receivers, one or more compact disc (CD) players, one or more video cassette recorders (VCRs), one or more digital video disc (DVD) players, one or more satellite decoders, one or more cable television decoders, one or more set top boxes, one or more computer systems, and one or more electronic mail appliances; and present a customized user interface with the wireless controller corresponding to the selected one or more network appliances to control one or more appliances wherein the customized user interface is based, at least in part, on the estimated location of the wireless controller, the proximity of the wireless controller to one or more appliances, previous selections made with the wireless controller, and environmental conditions including time of day, day of the week and month.

2. The article of claim 1 wherein the content that causes the one or more processors to use the retrieved location-signal strength information to estimate the current location for the wireless controller comprises content that, when executed, causes the one or more processors to:

select location-signal strength information having a signal strength closest to the determined signal strength; and estimate the current location of the wireless controller to be a location from the selected location-signal strength information.

3. The article of claim 2 wherein the content that causes the one or more processors to select location-signal strength information having a signal strength closest to the determined signal strength comprises content that, when executed, causes the one or more processors to:

select location-signal strength information associated with one or more of the network appliances sharing the wireless local area network.

4. The article of claim 1 wherein the content that causes the one or more processors to estimate the location of the wireless controller comprises content that, when executed, causes the one or more processors to predict the location of the wireless controller.

5. The article of claim 4 wherein the content that causes the one or more processors to predict the current location for the wireless controller comprises content that, when executed, causes the one or more processors to:

retrieve location-signal strength information corresponding to multiple signal strengths; and interpolate the current location of the wireless controller using at least two of the retrieved location-signal strength information.

6. The article of claim 4 wherein the content that causes the one or more processors to predict the current location for the wireless controller comprises content that, when executed, causes the one or more processors to:

retrieve location-signal strength information corresponding to multiple signal strengths; and extrapolate the current location of the wireless controller using at least two of the retrieved location-signal strength information.

7. A method comprising:

estimating a location of a wireless controller based, at least in part, on a detected signal strength of the wireless controller in relation to retrieved previously generated location-signal strength information, wherein the wireless controller comprises a wireless control device for at least one of the one or more network appliances;

selecting one or more of the network appliances based, at least in part, on the estimated location, device policies associated with the wireless controller, and historical data corresponding to previous use of the wireless controller, wherein the selected one or more network appliances share a wireless local area network, and the appliances comprise one or more of: one or more televisions, one or more radio receivers, one or more compact disc (CD) players, one or more video cassette recorders (VCRs), one or more digital video disc (DVD) players, one or more satellite decoders, one or more cable television decoders, one or more set top boxes, one or more computer systems, and one or more electronic mail appliances; and presenting a customized user interface with the wireless controller corresponding to the selected one or more network appliances to control one or more appliances wherein the customized user interface is based, at least in part, on the estimated location of the wireless controller, the proximity of the wireless controller to one or more appliances, previous selections made with the wireless controller, and environmental conditions including time of day, day of the week and month.

8. The method of claim 7 wherein using the retrieved location-signal strength information to estimate the current location for the wireless controller comprises:

selecting location-signal strength information having a signal strength closest to the determined signal strength; and estimating the current location of the wireless controller to be a location from the selected location-signal strength information.

9. The method of claim 8 wherein selecting location-signal strength information having a signal strength closest to the determined signal strength comprises:

selecting location-signal strength information associated with one or more of the network appliances sharing the wireless local area network.

10. The method of claim 7 wherein estimating the location of the wireless controller comprises predicting the location of the wireless controller.

11. The method of claim 10 wherein predicting the current location for the wireless controller comprises:

retrieving location-signal strength information corresponding to multiple signal strengths; and interpolating the current location of the wireless controller using at least two of the retrieved location-signal strength information.

12. The method of claim 10 wherein predicting the current location for the wireless controller comprises:

retrieving location-signal strength information corresponding to multiple signal strengths; and extrapolating the current location of the wireless controller using at least two of the retrieved location-signal strength information.

* * * * *